(12) United States Patent
Bchir et al.

(10) Patent No.: US 7,583,871 B1
(45) Date of Patent: Sep. 1, 2009

(54) SUBSTRATES FOR OPTICAL DIE STRUCTURES

(76) Inventors: Omar J. Bchir, 1024 E. Frye Rd. Unit 1035, Phoenix, AZ (US) 85048; Islam Salama, 4435 E. Cherry Hills Dr., Chandler, AZ (US) 85249; Charan Gurumurthy, 504 N. Swallow La., Higley, AZ (US) 85236; Houssam Jomaa, 4344 E. Muirwood Dr., Phoenix, AZ (US) 85048; Ravi Nalla, 4344 E. Muirwood Dr., Chandler, AZ (US) 85048; Yonggang Li, 343 W. Canary Way, Chandler, AZ (US) 85248

( * ) Notice: Subject to any disclaimer, the term of this patent is extended or adjusted under 35 U.S.C. 154(b) by 0 days.

(21) Appl. No.: 12/052,637

(22) Filed: Mar. 20, 2008

(51) Int. Cl.
*G02B 6/12* (2006.01)
*H01L 21/00* (2006.01)

(52) U.S. Cl. .............. 385/14; 385/49; 385/88; 385/89; 385/92; 438/26; 438/27; 438/29; 438/31

(58) Field of Classification Search .............. 385/14, 385/92, 93, 94, 88, 89, 49; 438/26, 27, 29, 438/31, 98; 29/846, 852; 257/678, 680, 257/734
See application file for complete search history.

(56) References Cited

U.S. PATENT DOCUMENTS

| | | | |
|---|---|---|---|
| 4,972,050 A * | 11/1990 | Hammond et al. | 174/251 |
| 6,858,475 B2 | 2/2005 | Gurumurthy et al. | 438/128 |
| 7,013,562 B2 | 3/2006 | Gurumurthy et al. | 29/852 |
| 7,042,077 B2 | 5/2006 | Walk et al. | 257/686 |
| 7,230,278 B2 * | 6/2007 | Yamada et al. | 257/80 |
| 7,237,334 B2 | 7/2007 | Salama et al. | 29/852 |
| 7,427,804 B2 * | 9/2008 | Yamada et al. | 257/678 |
| 2004/0000701 A1 * | 1/2004 | White et al. | 257/664 |
| 2005/0087747 A1 * | 4/2005 | Yamada et al. | 257/80 |
| 2007/0023889 A1 * | 2/2007 | Salmon | 257/698 |
| 2007/0148951 A1 | 6/2007 | Pang et al. | 438/614 |
| 2007/0152024 A1 | 7/2007 | Pang et al. | 228/178 |
| 2008/0042248 A1 | 2/2008 | Nalla et al. | 257/678 |

OTHER PUBLICATIONS

Salama, Islam et al., "Microelectronic Device Including Bridging Interconnect to Top Conductive Layer of Passive Embedded Structure and Method of Making Same", U.S. Patent Application filed Dec. 13, 2006 assigned U.S. Appl. No. 11/610,385.

(Continued)

*Primary Examiner*—Brian M Healy
(74) *Attorney, Agent, or Firm*—Joseph P. Curtin; Cool Patent, P.C.

(57) ABSTRACT

Package substrates for optical die structures are generally described. In one example, an apparatus includes a package substrate having one or more plated through hole (PTH) structures, an optical waveguide coupled with the package substrate, the optical waveguide having one or more input/output (I/O) optical signal pathways to route I/O signals to and from the package substrate, and one or more optical fibers coupled with the optical waveguide, the one or more optical fibers being disposed in the PTH structures to route I/O signals to and from a motherboard.

23 Claims, 5 Drawing Sheets

OTHER PUBLICATIONS

Salama, Islam et al., "Microelectronic Substrate Including Embedded Components and Spacer Layer and Method of Forming Same", U.S. Patent Application filed on Dec. 11, 2006 assigned U.S. Appl. No. 11/609,297.

Pang, Mengzhi et al., "Microelectronic Die Including Solder Caps on Bumping Sites Thereof and Method of Making Same", U.S. Patent Application filed on Dec. 28, 2006 assigned U.S. Appl. No. 11/617,589.

Lu, Daoqiang et al., "Assembly of Thin Die Coreless Package", U.S. Patent Application filed on Dec. 29, 2006 assigned U.S. Appl. No. 11/648,120.

Matayabas Jr, James C., et al., "Methods for Electroless Plating of Metal Traces on a Substrate and Devices and Systems Thereof", U.S. Patent Application filed on Dec. 29, 2006 assigned U.S. Appl. No. 11/618,528.

Li, Te et al., "High-power InGaAs VCSEL's single devices and 2-D arrays", Journal of Luminescence 122-123, (2007), pp. 571-573.

* cited by examiner

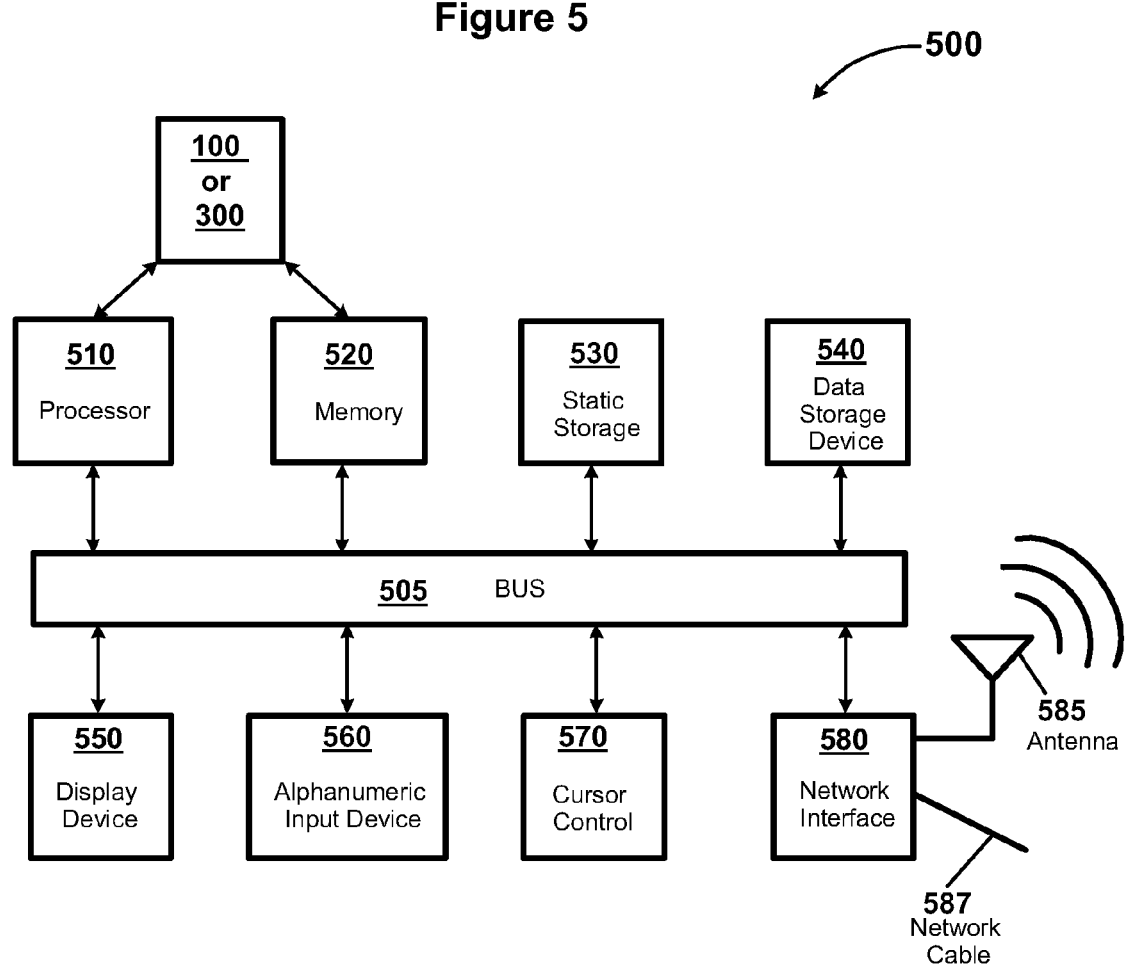

SUBSTRATES FOR OPTICAL DIE STRUCTURES

BACKGROUND

Generally, input/output signals between a package substrate and integrated circuit (IC) device, such as a semiconductor die, are electrically routed via metal bumps that couple the package substrate and IC device.

BRIEF DESCRIPTION OF THE DRAWINGS

Embodiments disclosed herein are illustrated by way of example, and not by way of limitation, in the figures of the accompanying drawings in which like reference numerals refer to similar elements and in which:

FIG. 5 is a diagram of an example system in which an assembly of FIG. 1 or an assembly of FIG. 3 may be used, according to but one embodiment.

Figure 1:
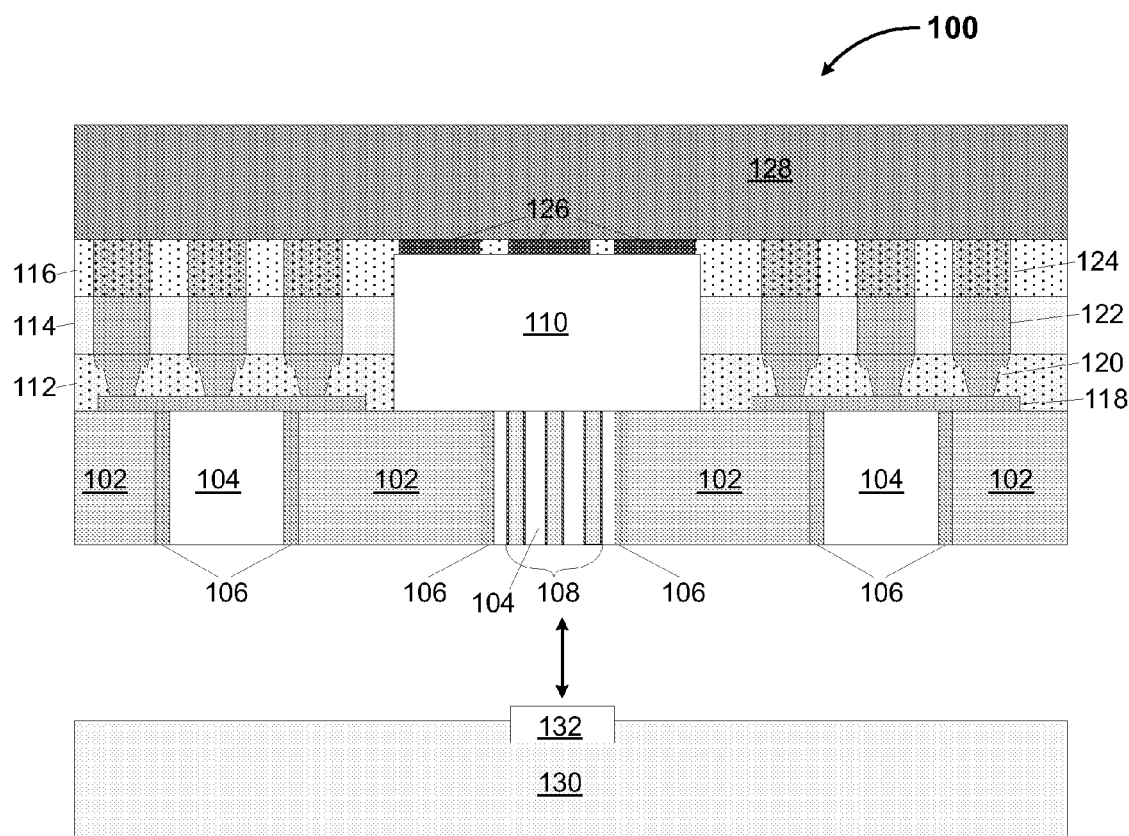
FIG. 1 is a side-view cross-section schematic of an assembly comprising a substrate for optical die structures, according to but one embodiment.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

Embodiments of substrates for optical die structures are described herein. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

FIG. 1 is a side-view cross-section schematic of a substrate for optical die structures, according to but one embodiment. In an embodiment, an assembly 100 includes a package substrate core 102, one or more plated-through hole (PTH) structures 104, metal 106, one or more optical fibers 108, optical waveguide 110, build-up dielectric layer 112, solder resist layer 114, underfill 116, PTH lid 118, substrate interconnects 120, substrate bumps 122, semiconductor die bumps 124, I/O optical structures of a semiconductor die 126, and semiconductor die 128, each coupled as shown. In another embodiment, an assembly 100 further includes a motherboard 130 coupled with the package substrate, the motherboard 130 including one or more I/O optical structures or sockets 132. Embodiments described herein may allow implementation of hybrid metal-optical semiconductor die 128 interconnect architecture 124, 126 onto package substrates or directly onto motherboards 130.

A package substrate may include a package substrate core 102, one or more PTH structures 104, one or more optical fibers 108, and optical waveguide 110, in an embodiment. In another embodiment, a package substrate further includes a build-up dielectric layer 112, solder resist layer 114, underfill 116, substrate interconnects 120, and/or substrate bumps 122. A package substrate may include similar elements between a package substrate core 102 and a motherboard 130 such as the elements 112, 114, 116, 118, 120, 122 depicted between package substrate core 102 and semiconductor die 128, for example. The individual features of assembly 100 may be exaggerated for the sake of clarity of discussion and may include more or less features of different size or scale in other embodiments. In an embodiment, a package substrate comprises a printed circuit board (PCB).

In an embodiment, a package substrate comprises a substrate core 102, a build-up dielectric layer 112 coupled to the core 102, a solder resist layer 114 coupled to the build-up dielectric layer 112, and an optically transparent underfill layer 116 coupled to the solder resist layer 114 and coupled to the semiconductor die 128. A substrate core 102 may include epoxy-based material such as fiberglass-reinforced epoxy, for example. A build-up dielectric 112 may include an epoxy-based material. Solder resist 114 may include a polymer material such as a polyacrylate-based photosensitive material. Optically transparent underfill 116 may include an epoxy-based material. Other suitable materials for layers 112, 114, 116 may be used in other embodiments.

Metal 106, PTH lid 118, substrate interconnects 120, substrate bumps 122, and/or semiconductor die bumps 124 may comprise an electrically conductive material to provide a medium for electrical signals. In an embodiment, such elements 106, 118, 120, 122, 124 comprise copper (Cu), solder materials, or combinations thereof. Bumps 122, 124 as used throughout this specification may refer to any electrically conductive interconnect structure including, for example, columns.

In an embodiment, an assembly 100 includes a package substrate core 102 comprising one or more PTH structures 104. One or more PTH structures 104 may comprise a plug material such as an epoxy-based material, for example. In an embodiment, the PTH structures 104 in the peripheral region of a package substrate are plugged with a material. In another embodiment, one or more PTH structures 104 in a central region of a package substrate allow one or more optical fibers 108 to be routed through the PTH structures 104. In an embodiment, a package substrate includes one or more power delivery bumps 122 that are disposed in a peripheral region of the package substrate and one or more optical fibers bundled through or disposed in one or more PTH structures in a central region of the package substrate.

An assembly 100 includes an optical waveguide 110 coupled with the package substrate core 102, according to an embodiment. Optical waveguide 110 may include one or more input/output (I/O) optical signal pathways to route I/O signals to and from a package substrate. In an embodiment, optical waveguide 110 is a laser-patterned glass. In another embodiment, the I/O optical signal pathways are portions of the optical waveguide 110 exposed to a focused laser beam wherein the focused laser creates an index of refraction in the I/O optical signal pathways that is different from the index of refraction for portions of the optical waveguide not exposed to the focused laser beam.

A semiconductor die 128 may be coupled to the package substrate. Semiconductor die 128 may be an integrated circuit die including a processor, for example. In an embodiment, a semiconductor die 128 comprises silicon, though other semiconductor materials may be used for a semiconductor die 128 in other embodiments.

Semiconductor die 128 may comprise a hybrid metal-optical die. In an embodiment, a semiconductor die 128 includes one or more I/O optical structures 126 and/or one or more power delivery bumps 124. I/O optical structures 126 may include any structure that transmits and/or receives input/output optical signals such as light including laser light. In an embodiment, I/O optical structures 126 include I/O optical contacts. The I/O optical structures 126 may be optically coupled to the I/O signal pathways of the optical waveguide 110, according to an embodiment. Such optical coupling may allow I/O optical signals to be routed to and from a semiconductor die 128. In an embodiment, underfill 116 is an optically transparent underfill 116 that allows I/O optical signals to pass through the underfill 116 between I/O structures 126 of semiconductor die 128 and the optical waveguide 110.

A semiconductor die 128 may include power delivery bumps 124 disposed in a peripheral region of the die 128 and one or more I/O optical structures 126 disposed in a central region of the die 128. Such arrangement may allow the semiconductor die 128 to mate up with the one or more power delivery bumps 122 and optical waveguide 110 of a package substrate. For example, the I/O optical structures 126 of the semiconductor die 128 are coupled to the I/O optical signal pathways of the optical waveguide 110 and the power delivery bumps 124 of the semiconductor die 128 are coupled to the power delivery bumps 122 of the package substrate according to an embodiment.

One or more optical fibers 108 may be coupled with the optical waveguide 110. In an embodiment, the one or more optical fibers 108 are optically coupled to the one or more I/O optical signal pathways of the optical waveguide 110. One or more optical fibers 108 may be bundled through or disposed in PTH structures 104 of the package substrate to route I/O signals to and from a motherboard 130. Optical fibers 108 may be integrated into a package substrate or PCB by weaving the optical fibers 108 into a package substrate core 102 or placing them in build-up dielectric layer 112 in one or more embodiments. One or more optical fibers 108 may include coaxial fibers, multi-mode fibers, or combinations thereof. One or more optical fibers 108 may be further described with respect to FIG. 2.

Use of bundled optical fibers 108 may reduce the number of PTH structures 104 required for a package substrate compared to package substrates that implement electrical I/O signals, allowing package substrates to scale to smaller size. Using optical signals for I/O signals between a semiconductor die 128, package substrate, and/or a motherboard 130, or another electronic device or devices may greatly increase I/O data rate compared to current electrical I/O signals. Optical I/O signals may also be decoupled from the power delivery benefiting electrical crosstalk.

A motherboard 130 may be coupled to the package substrate, in an embodiment. A motherboard 130 may include one or more optical structures or sockets 132 to optically couple the motherboard 130 with the one or more optical fibers 108 of the package substrate. The optical fibers 108 may be gathered together to form a socketable plug, which may be used with pin-grid array (PGA), land-grid array (LGA), or other sockets 132 as a hub. In an embodiment, an assembly 100 includes a motherboard 130 comprising one or more optical structures or sockets 132 coupled to the package substrate where the one or more optical fibers 108 of the package substrate are coupled to the one or more optical structures or sockets 132 of the motherboard 130, the one or more optical structures or sockets 132 to serve as hubs for the I/O signals routed by the one or more optical fibers 108. A motherboard 130 may include one or more transducers coupled to the one or more optical structures or sockets 132 of the motherboard to convert I/O optical signals received through optical structures or sockets 132 to electrical signals and/or to convert electrical signals to be transmitted through optical structures or sockets 132 to I/O optical signals. FIG. 1 may include an assembly 100 that incorporates embodiments of FIG. 2.

Figure 2:
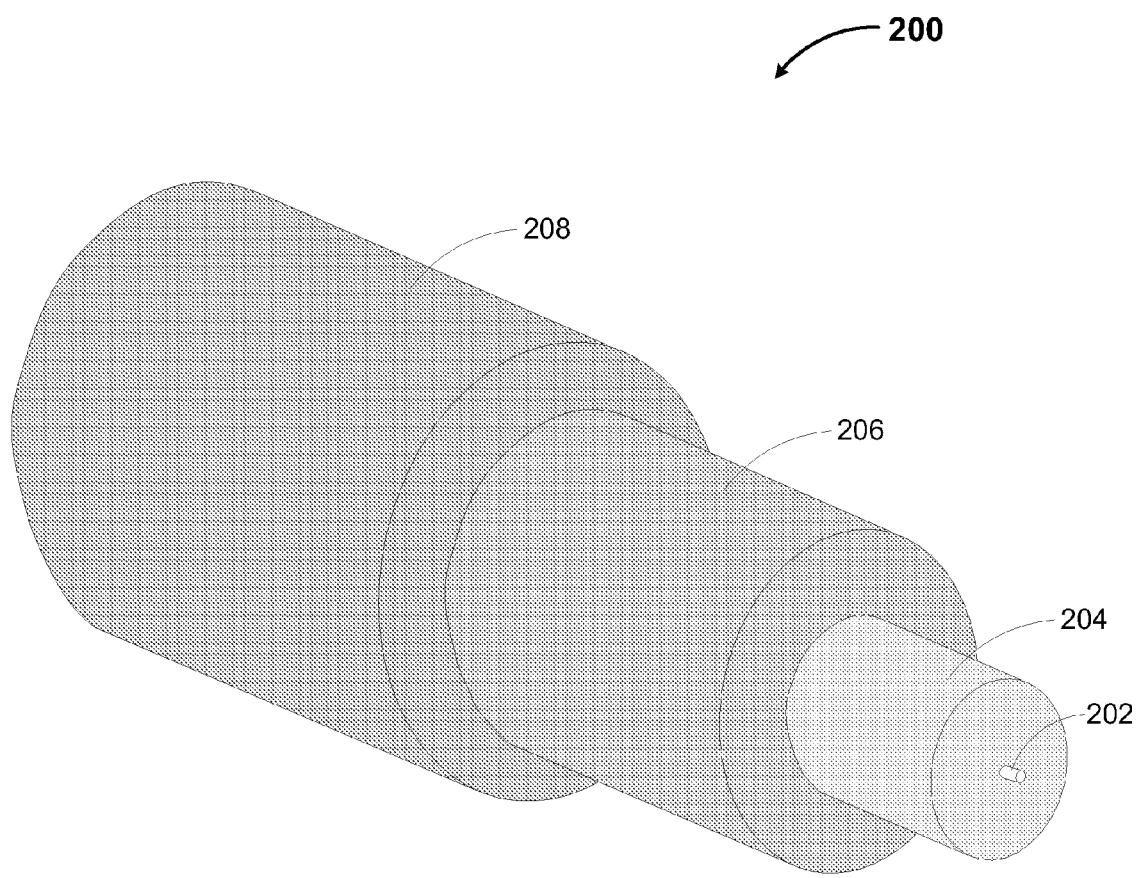
FIG. 2 is a cross-section schematic of an optical fiber, according to but one embodiment.

FIG. 2 is a cross-section schematic of an optical fiber, according to but one embodiment. In an embodiment, an optical fiber 200 includes a fiber core 202 and cladding 204. An optical fiber 200 may further include a buffer 206 and jacket 208 in other embodiments.

In an embodiment, an optical fiber 200 comprises glass material. For example, a fiber core 202 and cladding 204 may comprise silica ($SiO_2$) based glass wherein the fiber core 202 is doped to have a higher index of refraction than the cladding 204 such that an I/O optical signal travels along the fiber core 202. In an alternative embodiment, an optical fiber 200 includes polymer-based materials. For example, a fiber core 202 may comprise polymethyl methacrylate and cladding 204 may comprise fluorinated polymer material. Alternative materials suitable for an optical fiber 200 may be used in other embodiments. Material for cladding 204 may be selected to contain light signals within the fiber core 202. In an embodiment, an optical fiber 200 only includes a fiber core 202 and cladding 204. In another embodiment, a fiber core 202 may include an array of coaxial holes to carry optical signals according to photonic bandgap theory.

Buffer 206 may provide moisture protection for an optical fiber 200. In an embodiment, buffer 206 includes a low-porosity polymer. Jacket 208 may provide further protection for optical fiber 200. In an embodiment, jacket 208 includes polyvinyl chloride (PVC). Other suitable materials may be used for buffer 206 and/or jacket 208 in other embodiments.

An optical fiber 200 may be fabricated in a variety of sizes. In an embodiment, a fiber core 202 has a diameter that ranges between about 1 to 5 microns, a cladding 204 has a diameter that ranges between about 50 to 150 microns. A fiber 200 is not necessarily limited to these dimensions and may include other diameters or dimensions in other embodiments.

An optical fiber 200 may be a coaxial fiber, multi-mode fiber, or combinations thereof. A coaxial fiber may allow a single optical fiber to carry signals to and/or from an electronic device. A multi-mode fiber may allow different wavelength signals to simultaneously travel through a fiber core 202. For example, to avoid cross talk, a first wavelength may be selected for an "in" signal and a second wavelength may be selected for an "out" signal. An "in" signal may be an optical signal from a die to a package substrate or to a PCB and an "out" signal may be an optical signal from a package substrate or a PCB to a die according to an embodiment. In an embodiment, one or more optical fibers 200 allow high-speed data transmission between electronic devices such as semiconductor dies, package substrates, and/or motherboards.

Figure 3:
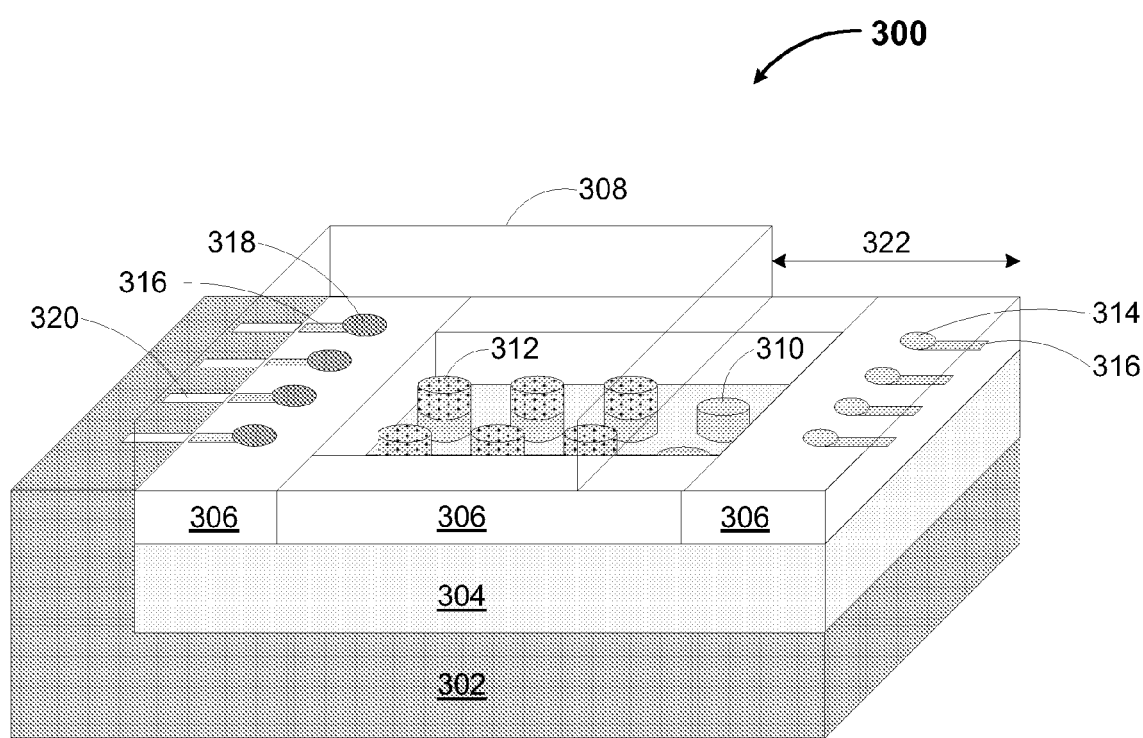
FIG. 3 is a cross-section schematic of an assembly comprising another substrate for optical die structures, according to but one embodiment.

FIG. 3 is a cross-section schematic of an assembly comprising another substrate for optical die structures, according to but one embodiment. In an embodiment, an assembly 300 includes a motherboard 302, a package substrate 304, an optical waveguide 306, a semiconductor die 308, one or more power delivery bumps 310 of the package substrate 304, one or more power delivery bumps 312 of the semiconductor die 308, one or more I/O optical signal pads 314 of the optical waveguide 306, one or more I/O optical signal traces 316 of the optical waveguide 306, one or more I/O optical structures 318 of the semiconductor die 308, and one or more I/O optical structures 320 of the motherboard 302, each coupled as shown.

Semiconductor die 308 has been depicted in FIG. 3 as being transparent to show the underlying elements of assembly 300. Semiconductor die 308 may be partially recessed in FIG. 3 as indicated by arrow 322 to more clearly differentiate which elements correspond with semiconductor die 308 and which elements correspond with other structures. For example, a package substrate 304, power delivery bumps 310, optical waveguide 306, and optical structures 314, 316 may be depicted in recessed area 322 as though semiconductor die 308 is not coupled at all to the package substrate 304 or to the optical waveguide 306. In other words, the structures associated with semiconductor die 308 may not be depicted in the recessed area 322.

In an embodiment, an assembly 300 includes a package substrate 304 comprising a peripheral region and a central region. For example, a peripheral region of the package substrate 304 may include the region wherein the package substrate 304 is coupled to the optical waveguide 306 and a central region of package substrate 304 may include the region wherein power delivery bumps 310, 312 are disposed, as depicted in FIG. 3. In an embodiment, a package substrate 304 includes one or more power delivery bumps 310 disposed in the central region of the package substrate. One or more power delivery bumps 310 may comprise an electrically conductive material such as Cu or solder materials, or combinations thereof. A package substrate 304 may include elements already described with respect to FIG. 1 in one or more embodiments.

An assembly 300 may further include an optical waveguide 306 coupled with the peripheral region of the package substrate 304. An optical waveguide 306 may include one or more I/O optical signal pads 314 and/or one or more I/O optical signal traces 316, the I/O optical signal pads 314 being optically coupled to the one or more I/O optical signal traces 316, to route I/O optical signals to and/or from one or more electronic devices 302, 304, 308.

An optical waveguide 306 may comprise a laser-patterned glass. For example, an optical waveguide 306 may be fabricated by direct laser writing in glass material. In an embodiment, a focused laser beam is used to write inside the glass, permanently changing the index of refraction along the path taken by the laser focus. A gradient of differing index of refraction in the glass may confine a light wave, forming a waveguide. In an embodiment, one or more I/O optical signal pads 314 and/or one or more I/O optical signal traces 316 are portions of the optical waveguide 306 exposed to a focused laser beam to create an index of refraction in the I/O optical signal pads 314 and/or the signal traces 316 that is different from the index of refraction for portions of the optical waveguide 306 not exposed to the focused laser beam. In an embodiment, I/O optical signal traces 316 have a lateral dimension on the order of microns and are flexibly routed using laser patterning.

An assembly 300 may further include a semiconductor die 308 coupled with the package substrate 304. A semiconductor die 308 may include one or more I/O optical structures 318 and one or more power delivery bumps 312. One or more I/O optical structures 318 may comprise one or more I/O optical contacts. In an embodiment, one or more I/O optical structures 318 of semiconductor die 308 are coupled to the one or more I/O optical signal pads 314 of the optical waveguide 306 to route I/O optical signals to and/or from the semiconductor die 308. In another embodiment, the one or more power delivery bumps 312 of the semiconductor die 308 are coupled to the one or more power delivery bumps 310 of the package substrate 304. The one or more I/O optical structures 318 may align and mate up to one or more I/O optical signal pads 314 of the optical waveguide 306.

An assembly 300 may further include a motherboard 302 coupled to the package substrate 304. A motherboard 302 may include one or more I/O optical structures 320 coupled to the one or more I/O optical signal traces 316 of the optical waveguide 306 to route I/O optical signals to and from the motherboard 302. In an embodiment, the one or more I/O optical structures 320 of the motherboard 302 comprise one or more optical fibers. Package substrate 304 and/or optical waveguide 306 may be embedded in the motherboard 302 such that the one or more optical fibers 320 of the motherboard 302 are aligned and directly coupled to the one or more I/O optical signal traces 316 of the optical waveguide 306. The motherboard 302 may have a recessed area into which the package substrate 304 with optical waveguide 306 is mounted. In an embodiment, a surface of the optical waveguide 306 with I/O optical signal pads 314 is flush with a surface of the motherboard 302 as depicted on the left side of FIG. 3.

Use of an optical waveguide 306 as described herein to route I/O optical signals to and from a motherboard 302, package substrate 304, and semiconductor die 308 may provide high speed data transmission over a short route. An optical waveguide 306 may provide a single layer route between a semiconductor die 308 and motherboard 302 without going through second level interconnects (SLI) between the package substrate 304 and the motherboard 302.

Figure 4:
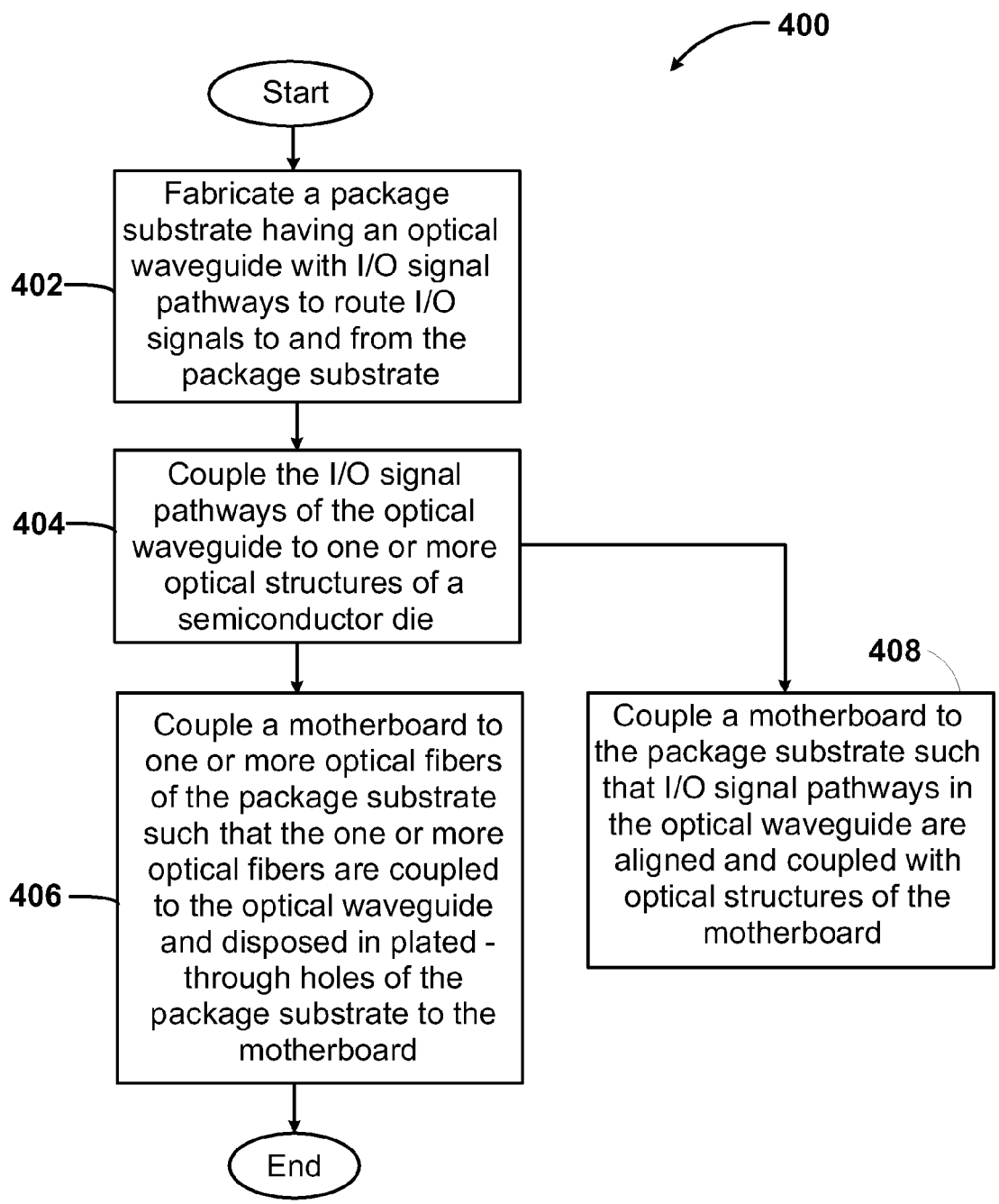
FIG. 4 is a flow diagram of a method for assembling a package substrate with other electronic devices, according to but one embodiment.

FIG. 4 is a flow diagram of a method for assembling a package substrate with other electronic devices, according to but one embodiment. In an embodiment, a method 400 includes fabricating a package substrate having an optical waveguide with input/output (I/O) signal pathways to route I/O signals to and from the package substrate at box 402, coupling the I/O signal pathways of the optical waveguide to one or more optical structures of a semiconductor die at box 404, and coupling a motherboard to one or more optical fibers of the package substrate such that the one or more optical fibers are coupled to the optical waveguide and bundled through or disposed in plated-through hole (PTH) structures of the package substrate to the motherboard at box 406, or alternatively, coupling a motherboard to the package substrate such that the I/O signal pathways in the optical waveguide are aligned and coupled with the optical structures of the motherboard at box 408.

In an embodiment, a method 400 includes fabricating a package substrate comprising an optical waveguide having I/O optical signal pathways to route I/O optical signals to and from the package substrate 402, coupling the I/O optical signal pathways of the optical waveguide to one or more I/O optical structures of a semiconductor die 404, and optically coupling a motherboard with the I/O optical signal pathways of the optical waveguide 406, 408.

Fabricating a package substrate 402 may include forming one or more power delivery bumps in a peripheral region of the package substrate and bundling one or more optical fibers through one or more PTH structures of the package substrate, the one or more optical fibers being coupled to the I/O optical signal pathways of the optical waveguide in a central region of the package substrate. In another embodiment, one or more optical fibers are woven into a package substrate core material, which may be routed through the package substrate core or bundled in one region of the package substrate to a socket plug, or combinations thereof.

Optically coupling a motherboard with the I/O optical signal pathways 406 may include optically coupling one or more I/O optical structures of the motherboard with the one or more optical fibers of the package substrate, the one or more optical fibers of the package substrate being coupled to the I/O optical signal pathways of the optical waveguide. In another embodiment, optically coupling a motherboard with the I/O optical signal pathways of the optical waveguide 406 includes coupling one or more optical sockets of the motherboard to the one or more optical fibers of the package substrate, the one or more optical sockets to serve as hubs for I/O optical signals routed by the one or more optical fibers. Embodiments of this paragraph and the preceding paragraph may describe actions of a method for forming an assembly that accords with FIGS. 1-2.

In an alternative embodiment, fabricating a package substrate 402 includes forming one or more power delivery bumps in a central region of the package substrate and forming the I/O optical signal pathways in a peripheral region of the package substrate using a focused laser beam to alter the index of refraction of the optical waveguide material such that the index of refraction of the I/O optical signal pathways is different than the index of refraction of optical waveguide material not exposed to the focused laser beam.

In an embodiment, optically coupling a motherboard with the I/O optical signal pathways of the optical waveguide 408 includes embedding the package substrate in the motherboard such that one or more I/O optical structures of the motherboard are aligned and directly coupled to the one or more optical signal pathways of the optical waveguide to route I/O optical signals to and from the motherboard. Embodiments of this paragraph and the preceding paragraph may describe actions of a method for forming an assembly that accords with FIG. 3. In other embodiments, a method 400 includes embodiments already described with respect to FIGS. 1-3.

A method 400 may more generally include coupling one or more power delivery bumps of the semiconductor die with one or more power delivery bumps of the package substrate. In embodiments that accord with FIG. 1, the power delivery bumps of the semiconductor die and package substrate may be disposed in the peripheral regions of the semiconductor die and package substrate. In embodiments that accord with FIG. 3, the power delivery bumps of the semiconductor die and package substrate may be disposed in the central regions of the semiconductor die and package substrate.

Fabricating a package substrate 402 may further include depositing a build-up dielectric layer to a package substrate core, depositing a solder resist layer to the build-up dielectric layer, and depositing an optically transparent underfill layer to the solder resist layer. Other package substrate structures described with respect to FIGS. 1-3 may be fabricated 402 in other embodiments.

Various operations may be described as multiple discrete operations in turn, in a manner that is most helpful in understanding the invention. However, the order of description should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

FIG. 5 is a diagram of an example system in which an assembly 100 of FIG. 1 or assembly 300 of FIG. 3 may be used, according to but one embodiment. System 500 is intended to represent a range of electronic systems (either wired or wireless) including, for example, desktop computer systems, laptop computer systems, personal computers (PC), wireless telephones, personal digital assistants (PDA) including cellular-enabled PDAs, set top boxes, pocket PCs, tablet PCs, DVD players, or servers, but is not limited to these examples and may include other electronic systems. Alternative electronic systems may include more, fewer and/or different components.

In one embodiment, electronic system 500 includes an assembly 100, 300 comprising package substrates for optical die structures in accordance with embodiments described with respect to FIGS. 1-4. In an embodiment, an assembly 100, 300 comprising package substrates for optical die structures as described herein comprises or is coupled to an electronic system's processor 510 or memory 520.

Electronic system 500 may include bus 505 or other communication device to communicate information, and processor 510 coupled to bus 505 that may process information. While electronic system 500 may be illustrated with a single processor, system 500 may include multiple processors and/or co-processors. In an embodiment, processor 510 is part of an assembly 100, 300 comprising package substrates for optical die structures in accordance with embodiments described herein. In an embodiment, processor 510 is a semiconductor die of assembly 100, 300. System 500 may also include random access memory (RAM) or other storage device 520 (may be referred to as memory), coupled to bus 505 and may store information and instructions that may be executed by processor 510.

Memory 520 may also be used to store temporary variables or other intermediate information during execution of instructions by processor 510. Memory 520 is a flash memory device in one embodiment. In another embodiment, memory 520 is coupled to an assembly 100, 300 comprising package substrates for optical die structures as described herein.

System 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled with electronic system 500.

Electronic system 500 may also be coupled via bus 505 to display device 550, such as a cathode ray tube (CRT) or liquid crystal display (LCD), to display information to a user. Alphanumeric input device 560, including alphanumeric and other keys, may be coupled to bus 505 to communicate information and command selections to processor 510. Another type of user input device is cursor control 570, such as a mouse, a trackball, or cursor direction keys to communicate information and command selections to processor 510 and to control cursor movement on display 550.

Electronic system 500 further may include one or more network interfaces 580 to provide access to network, such as a local area network. Network interface 580 may include, for example, a wireless network interface having antenna 585, which may represent one or more antennae. Network interface 580 may also include, for example, a wired network interface to communicate with remote devices via network cable 587, which may be, for example, an Ethernet cable, a coaxial cable, a fiber optic cable, a serial cable, or a parallel cable.

In one embodiment, network interface 580 may provide access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

In addition to, or instead of, communication via wireless LAN standards, network interface(s) 580 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In an embodiment, a system 500 includes one or more omnidirectional antennae 585, which may refer to an antenna that is at least partially omnidirectional and/or substantially omnidirectional, and a processor 510 coupled to communicate via the antennae.

The above description of illustrated embodiments, including what is described in the Abstract, is not intended to be exhaustive or to limit to the precise forms disclosed. While specific embodiments and examples are described herein for illustrative purposes, various equivalent modifications are possible within the scope of this description, as those skilled in the relevant art will recognize.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

What is claimed is:

1. An apparatus comprising:
   a package substrate comprising one or more plated through hole (PTH) structures;
   an optical waveguide coupled with the package substrate, the optical waveguide comprising one or more input/output (I/O) optical signal pathways to route I/O signals to and from the package substrate; and
   one or more optical fibers coupled with the optical waveguide, the one or more optical fibers being disposed in the PTH structures to route I/O signals to and from the package substrate.

2. An apparatus according to claim 1 further comprising:
   a semiconductor die comprising one or more I/O optical structures, the I/O optical structures being optically coupled to the I/O signal pathways of the optical waveguide.

3. An apparatus according to claim 1 wherein the package substrate comprises one or more power delivery bumps that are disposed in a peripheral region of the package substrate and wherein the one or more optical fibers are disposed in the PTH structures in a central region of the package substrate.

4. An apparatus according to claim 1 wherein the optical waveguide comprises a laser-patterned glass, the I/O optical signal pathways being portions of the optical waveguide exposed to a focused laser beam to create an index of refraction in the I/O optical signal pathways that is different from the index of refraction for portions of the optical waveguide not exposed to the focused laser beam and wherein the optical fibers comprise coaxial fibers, multi-mode fibers, or combinations thereof.

5. An apparatus according to claim 1 further comprising:
   a motherboard comprising one or more optical sockets coupled to the package substrate wherein the one or more optical fibers of the package substrate are coupled to the one or more optical sockets of the motherboard, the one or more sockets to serve as hubs for the I/O signals routed by the one or more optical fibers.

6. An apparatus according to claim 2 wherein the package substrate comprises a core, the apparatus further comprising:
   a build-up dielectric layer coupled to the core;
   a solder resist layer coupled to the build-up dielectric layer; and
   an optically transparent underfill layer coupled to the solder resist layer and coupled to the semiconductor die.

7. An apparatus comprising:
   a package substrate comprising a peripheral region and a central region; and
   an optical waveguide coupled with the peripheral region of the package substrate, the optical waveguide comprising a laser-patterned glass, one or more input/output (I/O) optical signal pads and one or more I/O optical signal traces, the I/O optical signal pads being optically coupled to the one or more I/O optical signal traces, to route I/O optical signals to and from one or more electronic devices.

8. An apparatus according to claim 7 wherein the package substrate comprises one or more power delivery bumps disposed in the central region of the package substrate.

9. An apparatus according to claim 8 further comprising:
   a semiconductor die coupled with the package substrate, the semiconductor die comprising one or more I/O optical structures and one or more power delivery bumps wherein the one or more I/O optical structures of the semiconductor die are coupled to the one or more I/O optical signal pads of the optical waveguide to route I/O optical signals to and from the semiconductor die and wherein the one or more power delivery bumps of the semiconductor die are coupled to the one or more power delivery bumps of the package substrate.

10. An apparatus according to claim 7 wherein the I/O optical signal traces comprise portions of the optical waveguide exposed to a focused laser beam to create an index of refraction in the signal traces that is different from the index of refraction for portions of the optical waveguide not exposed to the focused laser beam.

11. An apparatus according to claim 7 further comprising:
a motherboard coupled to the package substrate, the motherboard comprising one or more I/O optical structures coupled to the one or more I/O optical signal traces of the optical waveguide to route I/O optical signals to and from the motherboard.

12. An apparatus according to claim 11 wherein the one or more I/O optical structures of the motherboard comprise one or more optical fibers and wherein the package substrate is embedded in the motherboard such that the one or more optical fibers of the motherboard are aligned and directly coupled to the one or more I/O optical signal traces of the optical waveguide.

13. A method comprising:
fabricating a package substrate comprising an optical waveguide having input/output (I/O) optical signal pathways to route I/O optical signals to and from the package substrate by bundling one or more optical fibers through one or more plated-through hole structures of the package substrate or weaving one or more optical fibers into a package substrate core material, or combinations thereof, the one or more optical fibers being coupled to the I/O optical signal pathways of the optical waveguide in a central region of the package substrate;
coupling the I/O optical signal pathways of the optical waveguide to one or more I/O optical structures of a semiconductor die; and
optically coupling a motherboard with the I/O optical signal pathways of the optical waveguide.

14. A method according to claim 13 wherein fabricating a package substrate further comprises forming one or more power delivery bumps in a peripheral region of the package substrate.

15. A method according to claim 14 wherein optically coupling a motherboard with the I/O optical signal pathways of the optical waveguide comprises optically coupling one or more I/O optical structures of the motherboard with the one or more optical fibers of the package substrate.

16. A method according to claim 14 wherein optically coupling a motherboard with the I/O optical signal pathways of the optical waveguide comprises coupling one or more optical sockets of the motherboard to the one or more optical fibers of the package substrate, the one or more optical sockets to serve as hubs for I/O optical signals routed by the one or more optical fibers.

17. A method according to claim 13 wherein fabricating a package substrate comprises forming one or more power delivery bumps in a central region of the package substrate and forming the I/O optical signal pathways in a peripheral region of the package substrate using a focused laser beam to alter the index of refraction of the optical waveguide material such that the index of refraction of the I/O optical signal pathways is different than the index of refraction of optical waveguide material not exposed to the focused laser beam.

18. A method according to claim 17 wherein optically coupling a motherboard with the I/O optical signal pathways of the optical waveguide comprises embedding the package substrate in the motherboard such that one or more I/O optical structures of the motherboard are aligned and directly coupled to the one or more optical signal pathways of the optical waveguide to route I/O optical signals to and from the motherboard.

19. A method according to claim 13 further comprising:
coupling one or more power delivery bumps of the semiconductor die with one or more power delivery bumps of the package substrate.

20. A method according to claim 13 wherein fabricating a package substrate further comprises:
depositing a build-up dielectric layer to a package substrate core;
depositing a solder resist layer to the build-up dielectric layer; and
depositing an optically transparent underfill layer to the solder resist layer.

21. A method, comprising:
fabricating a package substrate comprising an optical waveguide having input/output (I/O) optical signal pathways to route I/O optical signals to and from the package substrate, wherein fabricating the package substrate comprises forming one or more power delivery bumps in a central region of the package substrate and forming the I/O optical signal pathways in a peripheral region of the package substrate using a focused laser beam to alter the index of refraction of the optical waveguide material such that the index of refraction of the I/O optical signal pathways is different than the index of refraction of optical waveguide material not exposed to the focused laser beam;
coupling the I/O optical signal pathways of the optical waveguide to one or more I/O optical structures of a semiconductor die; and
optically coupling a motherboard with the I/O optical signal pathways of the optical waveguide.

22. A method according to claim 21, wherein optically coupling a motherboard with the I/O optical signal pathways of the optical waveguide comprises embedding the package substrate in the motherboard such that one or more I/O optical structures of the motherboard are aligned and directly coupled to the one or more optical signal pathways of the optical waveguide to route I/O optical signals to and from the motherboard.

23. A method, comprising:
fabricating a package substrate comprising an optical waveguide having input/output (I/O) optical signal pathways to route I/O optical signals to and from the package substrate, wherein fabricating the package substrate comprises:
depositing a build-up dielectric layer to a package substrate core;
depositing a solder resist layer to the build-up dielectric layer; and
depositing an optically transparent underfill layer to the solder resist layer;
coupling the I/O optical signal pathways of the optical waveguide to one or more I/O optical structures of a semiconductor die; and
optically coupling a motherboard with the I/O optical signal pathways of the optical waveguide.

* * * * *

UNITED STATES PATENT AND TRADEMARK OFFICE
CERTIFICATE OF CORRECTION

PATENT NO.         : 7,583,871 B1
APPLICATION NO.    : 12/052637
DATED              : September 1, 2009
INVENTOR(S)        : Bchir et al.

Page 1 of 1

It is certified that error appears in the above-identified patent and that said Letters Patent is hereby corrected as shown below:

On the face page, in field (76), under "Inventors", in column 1, line 5, delete "Swallow La.," and insert -- Swallow Ln., --, therefor.

Signed and Sealed this

Twenty-seventh Day of October, 2009

David J. Kappos
*Director of the United States Patent and Trademark Office*